Aug. 1, 1950 N. H. YOUNG, JR 2,516,936

SIGNAL PULSE RESPONSIVE FACSIMILE RECEIVING SYSTEM

Original Filed Nov. 1, 1943 2 Sheets-Sheet 1

INVENTOR.
NORMAN H. YOUNG, JR.

BY Percy P. Lantzy
ATTORNEY

SIGNAL PULSE RESPONSIVE FACSIMILE RECEIVING SYSTEM

Original Filed Nov. 1, 1943 2 Sheets-Sheet 2

INVENTOR.
NORMAN H. YOUNG, JR.
BY Percy P. Lantzy
ATTORNEY

Patented Aug. 1, 1950

2,516,936

UNITED STATES PATENT OFFICE 2,516,936

SIGNAL PULSE RESPONSIVE FACSIMILE RECEIVING SYSTEM

Norman H. Young, Jr., Jackson Heights, N. Y., assignor to Federal Telephone and Radio Corporation, New York, N. Y., a corporation of Delaware Original application November 1, 1943, Serial No. 508,617. Divided and this application August 9, 1945, Serial No. 609,891

5 Claims. (Cl. 177—337)

This invention relates to methods and means for receiving intelligence, and more particularly to a radio receiving system of the type in which pulse signals are converted into intelligence-signifying indications.

This is a division of my copending application for "Methods and Means for Transmitting Intelligence," Serial No. 508,617, filed November 1, 1943, which issued as U. S. Pat. No. 2,407,336.

A further object of this invention is to provide means for receiving predeterminately timed synchronizing pulses and variably timed intelligence-signifying pulses and to combine them to give visual character designations.

Another object of this invention is to provide a communication system in which synchronizing pulses and variably timed intelligence-signifying pulses are stroboscopically combined at a receiver to give visual character readings.

Still another object of this invention is to provide improved visual signal-reproducing means responsive to the combined action of synchronizing pulses and intelligence-signifying pulses variously timed from the synchronizing pulses.

Generally speaking, this invention may be defined as comprising the construction and combinations recited in the drawings accompanying and forming a part of this application wherein.

Figure 1:
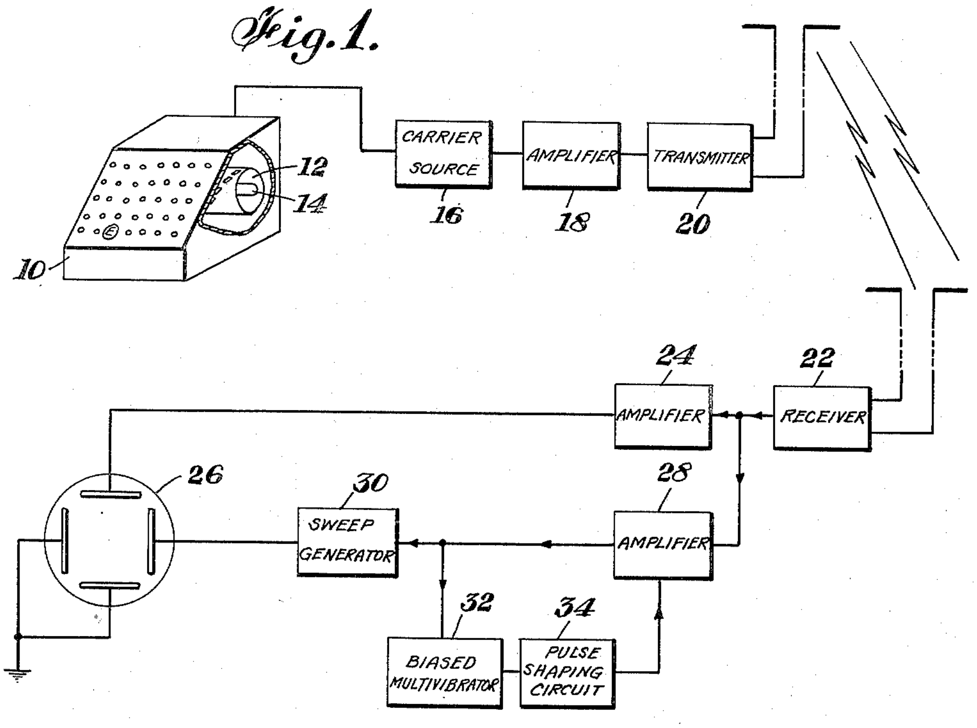
Fig. 1 is a block circuit diagram of a preferred form of communication system in accordance with the present invention.
Figure 2:
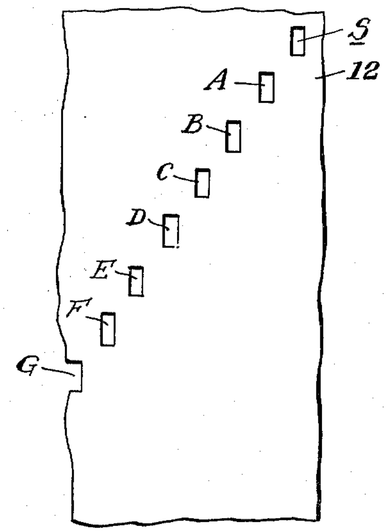
Fig. 2 is an enlarged plan view of a detail of one of the elements of the communication system illustrated in Fig. 1.

In the preferred and simplest form of the invention illustrated in Fig. 1, I propose to use pulse-generating apparatus of generally known form, consisting of a keyboard 10 provided with suitable indicia designating various characters to be selectively produced, which controls the passage of light through a rotatable drum 12 to a light-responsive cell or cells 14. Similar apparatus is already known in the art, for example, in the British patent to Creed and Company, 469,809, and also disclosed in the copending application of Edmond M. Deloraine, S. N. 415,554, filed October 18, 1941, which was issued as U. S. Pat. No. 2,365,458. As is more fully explained in the aforesaid patent and copending application, the different keys of the keyboard 10 control the passage of light through various openings on the rotatable drum 12 to initiate action of the light-sensitive device which, in turn, through suitable apparatus is converted into usable pulses. In accordance with the present invention the drum 12, shown in more detail in Fig. 2, may be provided with one or more openings *s* used to generate a series of regularly timed pulses used for synchronizing purposes. Each opening *s* is followed by laterally displaced additional openings indicated at A, B, C, D, E, F, G, by way of example, each one of these openings being spaced about the drum 12 a different distance from the synchronizing opening *s*. In accordance with the present invention no control of light through the opening *s* is necessary since this will produce synchronizing pulses which are desired at all times that the apparatus is operated. However, suitable means are provided, such as key-controlled shutters, for controlling the passage of light through the remaining openings, at will. It will be seen that if light is permitted to pass through opening A, a pulse will be generated, and timed after the synchronizing pulse formed by the opening *s* with a predetermined spacing. If the opening B is exposed, another pulse at a different time from the synchronizing pulse will be generated, etc. It will therefore be apparent that according to the present invention various characters are designated by individual pulses which differ in timed relationship with the synchronizing pulse.

The synchronizing pulse and the character-signifying pulse are both used to modulate a suitable carrier source 16, the output from which is amplified as by amplifier 18 and transmitted by transmitter 20.

The receiver 22 will demodulate the signals and at its output will produce both the synchronizing pulses and the timed intelligence-signifying pulses. The receiver output may be amplified as through amplifier 24 and thence connected across the vertical plates of a cathode ray tube 26. The receiver output is passed through another amplifier 28 controlling a sweep generator 30 connected across the horizontal plates of the cathode ray tube. However, in order to properly reproduce a signal or a character in accordance with that transmitted, the sweep generator 30 should be keyed by the synchronizing pulses only. For this purpose the output of the amplifier 28 is also directed to a suitable apparatus such as a biased multivibrator 32 whose output may then be passed through a pulse shaping circuit 34 to block the amplifier 28. The timing of the biased multivibrator 32 is so designed as to block the amplifier 28 upon the reception of a synchronizing pulse, and for a period substantially equal to the period between successive synchronizing pulses. Accordingly, intelligence-signifying pulses also impressed upon the amplifier 28 will not be effective to key the sweep generator, since such pulses all occur during this blocking period.

Figure 3:
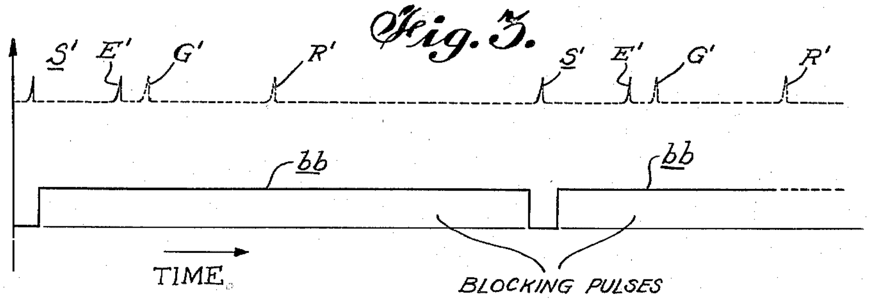
Fig. 3 is a chart illustrating the time spacing between certain intelligence-signifying pulses and the synchronizing pulses in accordance with the present invention, together with their relationship to an amplifier blocking pulse.

This operation may be more clearly understood from the diagram shown in Fig. 3. In the first place, the synchronizing pulses caused by the opening *s* in the pulse-generating device are shown at *s'* while, if it is assumed that the letter "E" is being transmitted, pulses properly spaced from the synchronizing pulses may appear at E'. Other pulses shown merely by way of example in order to indicate the general difference in timed relationship, are shown at G' and R'. All intelligence-signifying pulses will occur between successive synchronizing pulses *s'*. When a received synchronizing pulse *s'* passes through the amplifier 28, it not only initiates the action of the sweep generator 30 but also that of the biased multivibrator 32. The latter can be so designed as to produce a single pulse *bb* of predetermined length indicated at Fig. 3. As shown in Fig. 3 this pulse can be made to extend from the first of the synchronizing pulses *s'* substantially up to the next synchronizing pulse, blocking the amplifier 28 for that entire period, and as a result none of the intelligence-signifying pulses will falsely key the sweep generator.

Figure 4:
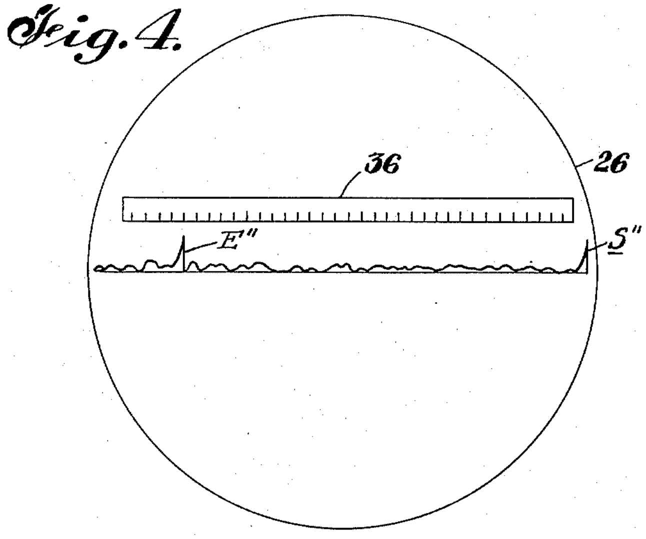
Fig. 4 is a front plan view of a cathode ray screen illustrating the manner in which signals are reproduced according to a preferred form of this invention.

As shown in Fig. 4, the cathode ray tube 26 may be provided on its screen with a suitable scale 36 bearing in spaced relation the characters corresponding to the characters transmitted. When the sweep generator, as initiated by the synchronizing pulse, begins its action to move the cathode ray beam across the screen at a predetermined time, the vertical plates of the cathode ray tube will be energized by an intelligence-signifying pulse whose position is so calibrated with the scale 36 as to point to the character originally transmitted and corresponding to this time spacing. In Fig. 4, by way of example, I have shown the pulse signal E'' appearing under the letter "E" on the scale 36, and thus the operator can pick out this letter and similar letters so indicated in accordance with the spacing and timing of the intelligence-signifying pulses. The synchronizing pulse is also applied to the vertical deflecting plates of the cathode ray tube but its position will be removed from the scale 36, being shown for example, at *s''* in Fig. 4.

In the form of invention described above, it has been assumed that the individual synchronizing pulses have the same parameters as the various intelligence-signifying pulses. It is known, however, that pulses may be distinguished by their parameters and if, for example, the synchronizing pulses are given a different parameter from the intelligence-signifying pulses, separation of such synchronizing pulses at the receiver may be more simply effected than in the system just described.

The system described above is admirably adapted to fulfill the objects primarily stated. While the timing of the synchronizing pulses and the following intelligence-signifying pulses can be varied in accordance with the desired apparatus and within limits which will be clear to those skilled in this art, I have found that the system is suitable for the conversion into letters for visual operation at a speed of approximately one character per second. Each character may be repeated twenty times in that second, and the timing at the receiver should be accurate within plus or minus 50 microseconds. The time of one revolution of the transmitting and receiving mechanism would be approximately 50 milliseconds. A suitable time rise of each pulse might be about 25 microseconds with a total pulse duration of 50–75 microseconds. With conventional methods of pulse transmission this would result in a ratio of peak-to-average power of about 2,000. The highest frequencies involved would probably not exceed 25 kilocycles, resulting in a band width of approximately 50 kilocycles.

Various changes coming within the scope of those skilled in this art are contemplated for carrying out the principles of the present invention. For example, in order to more clearly distinguish at the receiver between synchronizing and intelligence-signifying pulses, the two sets of pulses could be transmitted at different frequencies as disclosed, for example in my copending application S. N. 457,407, filed September 5, 1942, or the two may be distinguished by utilizing one as an amplitude modulator and another as a frequency modulator, with comparable discriminating apparatus at the receiver. Both of these methods would avoid all possibility of error due to keying of the synchronizing apparatus by the intelligence-signifying pulses, which might occur for a brief period, although this condition would soon automatically correct itself due to the regularity of the synchronizing pulses and the irregularity between different sets of intelligence-signifying pulses. Obviously the system is applicable to direct or carrier wire transmission as well as radio transmission. Accordingly, while I have described above the principles of my invention in connection with certain specific apparatus and particular modifications thereof, it is to be clearly understood that this description is made only by way of example and not as a limitation on the scope of my invention as set forth in the objects and the accompanying claims.

I claim:

1. In a receiving system for intelligence-signifying pulses wherein said pulses are interleaved with synchronizing pulses of a predetermined frequency and said intelligence-signifying pulses occur in sets at the same predetermined frequency as said synchronizing pulses and at a different time spacing from a preceding synchronizing pulse according to an intelligence character; means for separating the synchronizing pulses from the intelligence-signifying pulses, means carrying a set of indicia corresponding to the intelligence characterized by each set of intelligence-signifying pulses, and means responsive to the combined action of said synchronizing pulses and the spacing between the synchronizing pulses and the intelligence-signifying pulses for designating the proper indicia in accordance with the transmitted intelligence-signifying pulses, said pulse separating means including a receiver for said pulses, an amplifier connected to the output of said receiver, and means responsive to the reception of a synchronizing pulse for blocking said amplifier for a period slightly less than the time interval between synchronizing pulses, whereby the output from said amplifier will consist of synchronizing pulses only.

2. In a receiving system for intelligence-signifying pulses wherein said pulses are interleaved with synchronizing pulses of a predetermined frequency and said intelligence-signifying pulses occur in sets at the same predetermined frequency as said synchronizing pulses and at a different time spacing from a preceding synchronizing pulse according to an intelligence character, means for separating the synchronizing pulses from the intelligence-signifying pulses, means for receiving both series of pulses, means connected to said receiving means and forming a branch thereof for blocking all but the synchronizing pulses from the two received series of pulses in said branch in response to any received first synchronizing pulse, a cathode ray tube at said receiver, means carrying a set of indicia corresponding to the intelligence characterized by the sets of intelligence-signifying pulses positioned in viewable juxtaposition to the screen of the cathode ray tube, and means responsive to the combined action of said synchronizing pulses and the intelligence-signifying pulses actuating said cathode ray tube for positioning the cathode ray beams to designate the proper indicia in accordance with the transmitted intelligence-signifying pulses.

3. A receiving system according to claim 2, in which said pulse-distinguishing means includes an amplifier connected to said receiving means, and means responsive to the reception of a synchronizing pulse for blocking said amplifier for a period slightly less than the time interval between synchronizing pulses, whereby the output from said amplifier will consist of synchronizing pulses only.

4. In a receiving system for intelligence-signifying pulses wherein said pulses are interleaved with synchronizing pulses of a predetermined frequency and said intelligence-signifying pulses occur in sets at the same predetermined frequency as said synchronizing pulses and at a different time spacing from a preceding synchronizing pulse according to an intelligence character; means for separating the synchronizing pulses from the intelligence-signifying pulses, means for receiving both series of pulses, means connected to said receiving means and forming a branch thereof for blocking all but the synchronizing pulses from the two received series of pulses in said branch in response to any received first synchronizing pulse, a cathode ray tube having two pairs of deflecting plates at an angle to one another, means carrying a set of indicia corresponding to the intelligence-signifying pulses, positioned in viewable juxtaposition to the screen of the cathode ray tube, means energizing one pair of deflecting plates from the receiver output, and means energizing the other pair of deflecting plates by the synchronized pulses only.

5. A receiving system according to claim 4, in which said pulse-distinguishing means includes an amplifier connected to said receiving means, and means responsive to the reception of a synchronizing pulse for blocking said amplifier for a period slightly less than the time interval between synchronizing pulses, whereby the output from said amplifier will consist of synchronizing pulses only.

NORMAN H. YOUNG, JR.

REFERENCES CITED

The following references are of record in the file of this patent:

UNITED STATES PATENTS

| Number | Name | Date |
|---|---|---|
| 1,933,650 | Bascom | Nov. 7, 1933 |
| 2,082,575 | Harrison | June 1, 1937 |
| 2,104,544 | Lemmon et al. | Jan. 4, 1938 |
| 2,168,460 | Watson | Aug. 8, 1939 |
| 2,267,827 | Hubbard | Dec. 30, 1941 |
| 2,381,920 | Miller | Aug. 14, 1945 |
| 2,407,336 | Young | Sept. 10, 1946 |
| 2,418,406 | Hanley | Apr. 1, 1947 |